(12) United States Patent
Stewart et al.

(10) Patent No.: US 12,544,124 B2
(45) Date of Patent: Feb. 10, 2026

(54) MULTIPLE PULSE WIDTH TRAINS TO ENHANCE ABLATION HOMOGENEITY IN HIGHLY ORIENTED CELLULAR SUBSTRATES

(71) Applicant: Medtronic, Inc., Minneapolis, MN (US)

(72) Inventors: Mark T. Stewart, Lino Lakes, MN (US); Lars M. Mattison, Blaine, MN (US); Brian T. Howard, Minneapolis, MN (US); Damijan Miklavcic, Ljubljana (SI); Tadej Kotnik, Ljubljana (SI); Janja Dermol-Cerne, Ljubljana (SI); Tina Batista Napotnik, Ljubljana (SI)

(73) Assignee: Medtronic, Inc., Minneapolis, MN (US)

( * ) Notice: Subject to any disclaimer, the term of this patent is extended or adjusted under 35 U.S.C. 154(b) by 500 days.

(21) Appl. No.: 18/295,416

(22) Filed: Apr. 4, 2023

(65) Prior Publication Data
US 2023/0310061 A1 Oct. 5, 2023

Related U.S. Application Data

(60) Provisional application No. 63/327,073, filed on Apr. 4, 2022.

(51) Int. Cl.
*A61B 18/12* (2006.01)
*A61B 18/14* (2006.01)
(Continued)

(52) U.S. Cl.
CPC ........... *A61B 18/1206* (2013.01); *A61B 2017/00176* (2013.01); *A61B 2017/00185* (2013.01);
(Continued)

(58) Field of Classification Search
CPC .............. A61B 2018/00613; A61N 1/327
See application file for complete search history.

(56) References Cited

U.S. PATENT DOCUMENTS 6,300,108 B1 10/2001 Rubinsky et al.
6,714,816 B1 3/2004 Heller et al.
(Continued)

OTHER PUBLICATIONS

Chaigne et al., "Reversible and Irreversible Effects of Electroporation on Contractility and Calcium Homeostasis in Isolated Cardiac Ventricular Myocytes", Circulation: Arrhythmia and Electrophysiology, 2022, vol. 15, pp. 762-772, and 6 pages of Supplemental Material.

(Continued)

*Primary Examiner* — Sean W Collins
(74) *Attorney, Agent, or Firm* — Michael Best & Friedrich LLP

(57) ABSTRACT

A method of delivering pulsed electric field energy to perform ablation of a tissue includes providing a pulse train to an electrode. The pulse train may include a first set of pulses with a first pulse width to generate first electric field and a second set of pulses with a second pulse width greater than the first pulse width to generate a second electric field. The electrode may be positioned at a same position during generation of the first electric field and the second electric field. The first electric field may be configured to have a higher electroporation effect on the first elongated cells having a first orientation than on second elongated cells having a second orientation. The second electric field may be configured to have a higher electroporation effect on the second cells than on the first cells.

22 Claims, 12 Drawing Sheets

(51) Int. Cl.
  *A61B 17/00* (2006.01)
  *A61B 18/00* (2006.01)

(52) U.S. Cl.
  CPC .......... *A61B 2017/0019* (2013.01); *A61B 2018/00577* (2013.01); *A61B 2018/00613* (2013.01); *A61B 2018/00726* (2013.01); *A61B 2018/128* (2013.01); *A61B 18/1492* (2013.01)

(56) References Cited

U.S. PATENT DOCUMENTS

| | | |
|---|---|---|
| 7,001,383 B2 | 2/2006 | Keidar |
| 7,367,944 B2 | 5/2008 | Rosemberg et al. |
| 7,668,592 B2 | 2/2010 | Heller et al. |
| 7,976,537 B2 | 7/2011 | Lieber et al. |
| 8,155,416 B2 | 4/2012 | Nields et al. |
| 8,328,726 B2 | 12/2012 | Varghese et al. |
| 9,724,018 B2 | 8/2017 | Cho et al. |
| 10,064,564 B2 | 9/2018 | Kowalski et al. |
| 10,258,406 B2 | 4/2019 | Long |
| 10,531,914 B2 | 1/2020 | Stewart |
| 2005/0203502 A1 | 9/2005 | Boveja et al. |
| 2008/0132792 A1 | 6/2008 | Rosemberg et al. |
| 2011/0098695 A1 | 4/2011 | Brannan |
| 2019/0038171 A1 | 2/2019 | Howard |
| 2021/0169568 A1* | 6/2021 | Govari ............... A61B 18/1206 |
| 2022/0022952 A1* | 1/2022 | Koop ................. A61B 18/1492 |
| 2022/0104873 A1* | 4/2022 | Beeckler ............ A61B 18/1492 |

OTHER PUBLICATIONS

Dermol-Cerne et al., "Short microsecond pulses achieve homogeneous electroporation of elongated biological cells irrespective of their orientation in electric field", Scientific Reports, 2020, vol. 10, 17 pages.

* cited by examiner

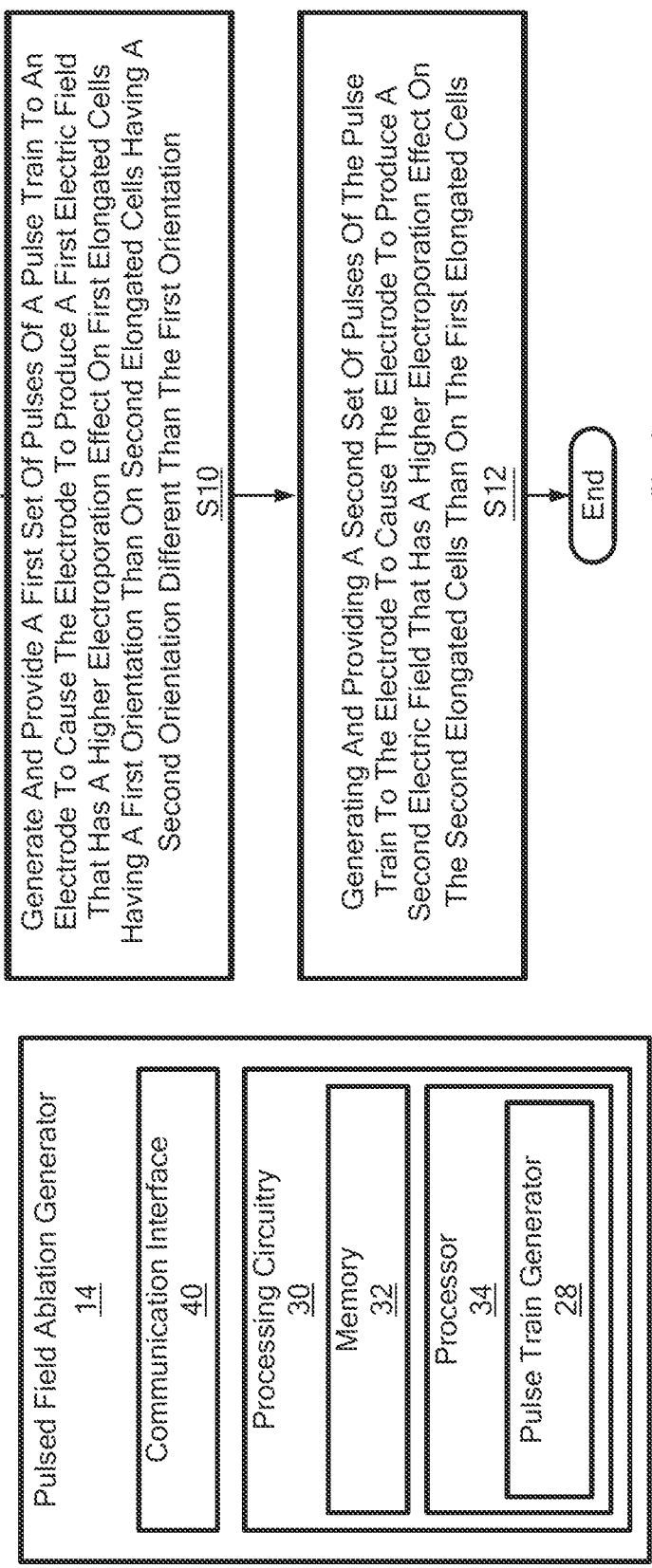

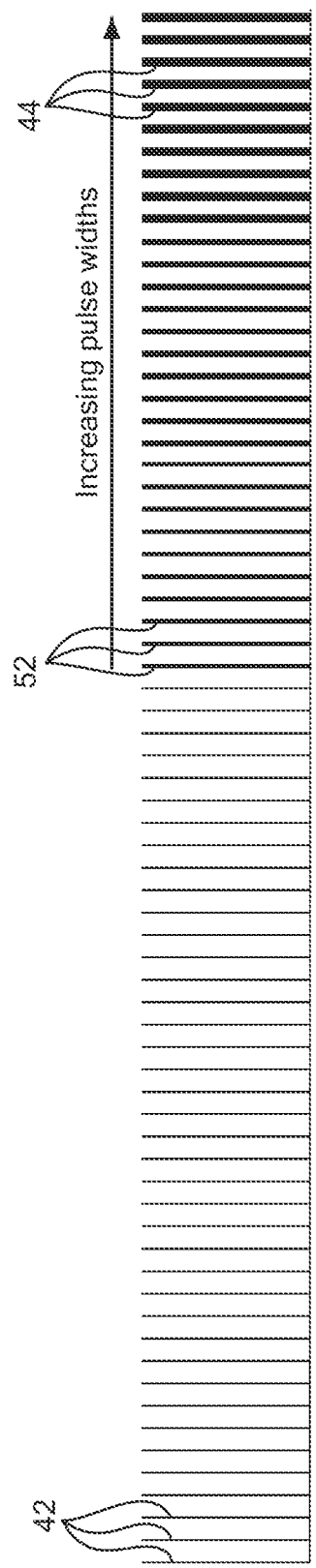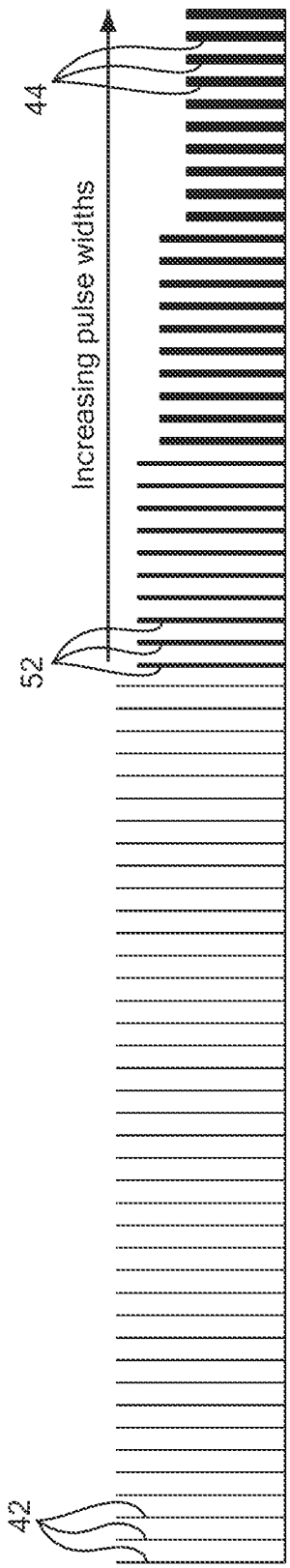

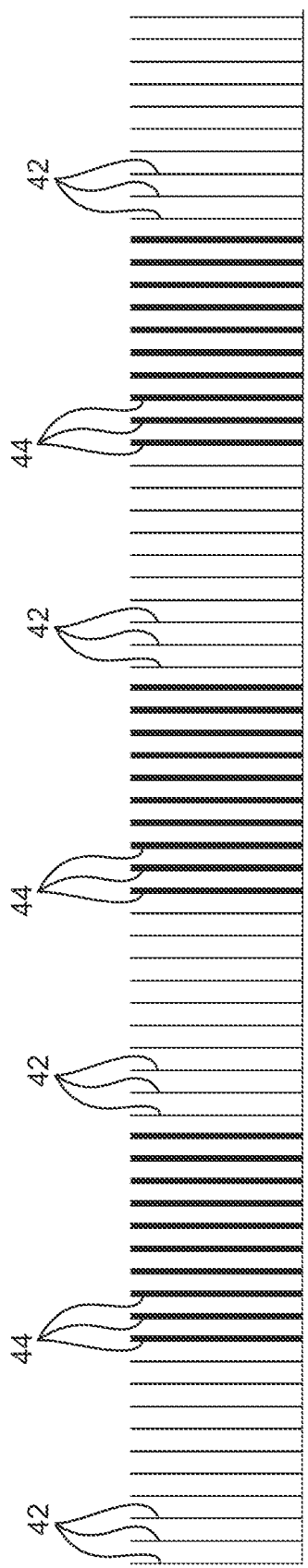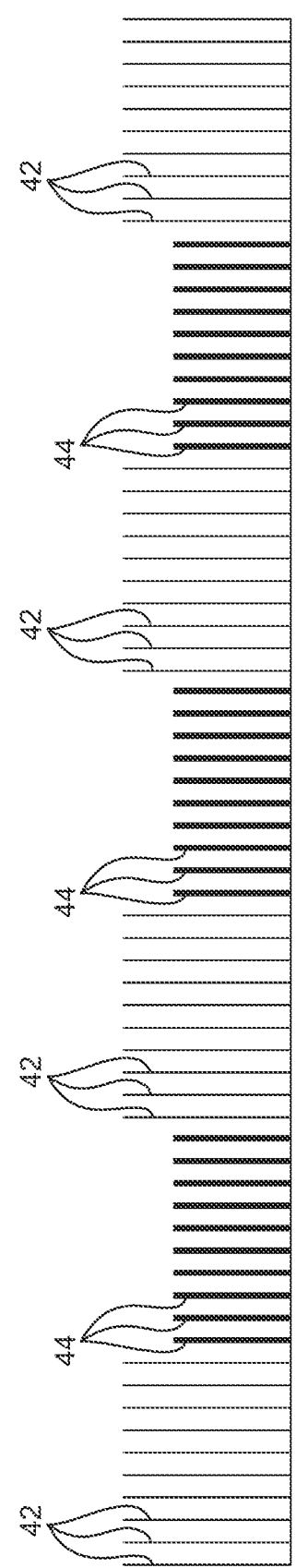

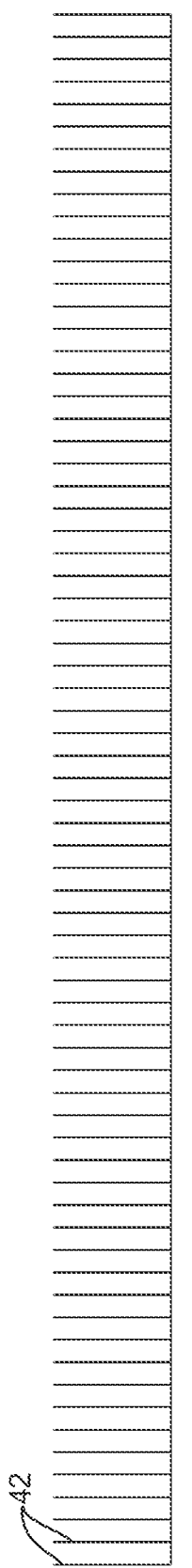 
FIG. 12A
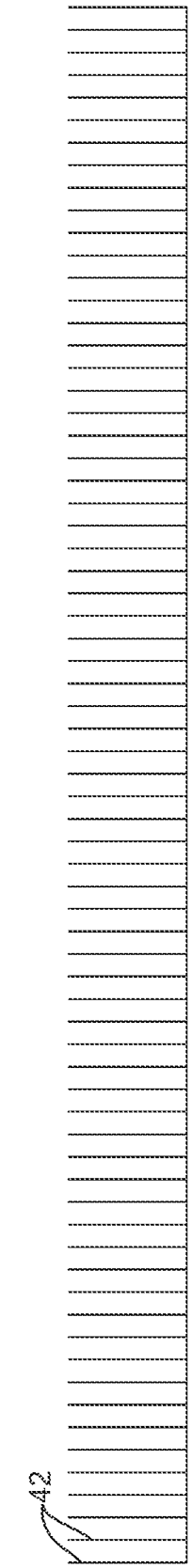 
FIG. 12B

MULTIPLE PULSE WIDTH TRAINS TO ENHANCE ABLATION HOMOGENEITY IN HIGHLY ORIENTED CELLULAR SUBSTRATES

CROSS-REFERENCE TO RELATED APPLICATION

This application claims priority to U.S. Provisional Application No. 63/327,073, filed on Apr. 4, 2022, the entire contents of which are hereby incorporated by reference.

FIELD

The present technology is generally related to pulsed electric field ablation, and in particular to multiple pulse width trains to enhance ablation homogeneity in highly oriented cellular substrates.

SUMMARY

Pulsed electric field (PEF) ablation or pulsed field ablation (PFA) is an ablation modality in which high voltage pulses are delivered from one or more electrodes to cause electroporation of a target tissue. In a typical application, a catheter with a plurality of electrodes in communication with a PEF generator is advanced to a location proximate the tissue to be ablated. High voltage pulses are delivered in a bipolar or monopolar manner which causes the creation of an electric field which electroporates the target tissue.

Electric field orientation with respect to an orientation of a cell of the tissue has a significant effect on the lethal threshold of electric field gradients. Electric fields delivered from a set of catheter electrodes may kill more cells that are oriented in the most susceptible direction and less cells that are oriented in a less susceptible direction, resulting in non-homogenous ablation. However, uniform homogeneous ablation is a desirable result. One approach to overcome the non-homogeneity is to re-orient the catheter electrodes to achieve re-orientation of the electric field-gradient, but this has limitations due to inability to substantially change the field line orientation with respect to the underlying tissues. For example, the orientation of long aspect ratio elongated cells may affect the threshold at which irreversible electroporation may be achieved in the elongated cells. Also, shorter pulse widths may be more effective at electroporating certain types of cells elongated in a direction perpendicular to the electric field. In contrast, longer pulse widths may be more effective at electroporating certain types of cells elongated in a direction parallel to the electric field.

The techniques of this disclosure generally relate to pulsed electric field ablation, and in particular to multiple pulse width trains to enhance ablation homogeneity in highly oriented cellular substrates.

Some embodiments allow PFA to operate more effectively (e.g., resulting in more uniform homogenous ablation compared to other techniques or resulting in approximately uniform homogenous ablation) regardless of an orientation of a catheter/electrodes providing an electric field to the tissue being ablated. For example, some embodiments minimize the importance of cellular orientation with respect to the electric field orientation achieved between electrodes. In some embodiments, the more uniform homogenous ablation is achieved without repositioning the electrodes; but rather, the more uniform homogenous ablation is achieved by delivering pulse trains that combine both shorter and longer pulses in order to enhance the electroporation effect at a lower overall threshold for elongated cells, regardless of orientation.

According to one aspect, a method of delivering pulsed electric field energy to perform ablation of a tissue is provided. The method includes providing a pulse train to an electrode to cause the electrode to produce an electric field to ablate a plurality of cells of the tissue. The plurality of cells may include first elongated cells having a first orientation and second elongated cells having a second orientation different than the first orientation. The pulse train may include a first set of pulses with a first pulse width and a second set of pulses with a second pulse width greater than the first pulse width. The electric field may include a first electric field generated by the electrode based on the first set of pulses and a second electric field generated by the electrode based on the second set of pulses. The electrode may be positioned at a same position during generation of the first electric field and the second electric field such that the first electric field and the second electric field are emitted from the same position and in a same direction toward the tissue. The first electric field may be configured to have a higher electroporation effect on the first cells than on the second cells. The second electric field may be configured to have a higher electroporation effect on the second cells than on the first cells.

According to another aspect, a generator configured to deliver pulsed electric field energy to perform ablation of a tissue is provided. The generator includes processing circuitry configured to provide a pulse train to an electrode to cause the electrode to produce an electric field to ablate a plurality of cells of the tissue. The plurality of cells may include first elongated cells having a first orientation and second elongated cells having a second orientation different than the first orientation. The pulse train may include a first set of pulses with a first pulse width and a second set of pulses with a second pulse width greater than the first pulse width. The electric field may include a first electric field generated by the electrode based on the first set of pulses and a second electric field generated by the electrode based on the second set of pulses. The electrode may be positioned at a same position during generation of the first electric field and the second electric field such that the first electric field and the second electric field are emitted from the same position and in a same direction toward the tissue. The first electric field may be configured to have a higher electroporation effect on the first cells than on the second cells. The second electric field may be configured to have a higher electroporation effect on the second cells than on the first cells.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 2 is a block diagram of a pulsed field ablation generator configured according to principles set forth herein.

FIG. 3 is a flow chart of an example process for generating and transmitting pulse trains according to principles set forth herein.

FIG. 5A is a graph of another example pulse train delivered by the system shown in FIG. 1.

FIG. 5B is a graph of another example pulse train delivered by the system shown in FIG. 1.

FIG. 9A is a graph of another example pulse train delivered by the system shown in FIG. 1.

FIG. 9B is a graph of another example pulse train delivered by the system shown in FIG. 1.

FIG. 12A is a graph of another example pulse train delivered by the system shown in FIG. 1.

FIG. 12B is a graph of another example pulse train delivered by the system shown in FIG. 1.

DETAILED DESCRIPTION

Some embodiments overcome the problem of ablation of cells of having a different efficacy for cells of different orientations for the same ablation cycle. Certain aspects of the present disclosure are based upon the recognition that cells of different orientation can be selectively targeted/more effectively ablated by applying a sequence of ablative pulses of different pulse widths.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Figure 1:
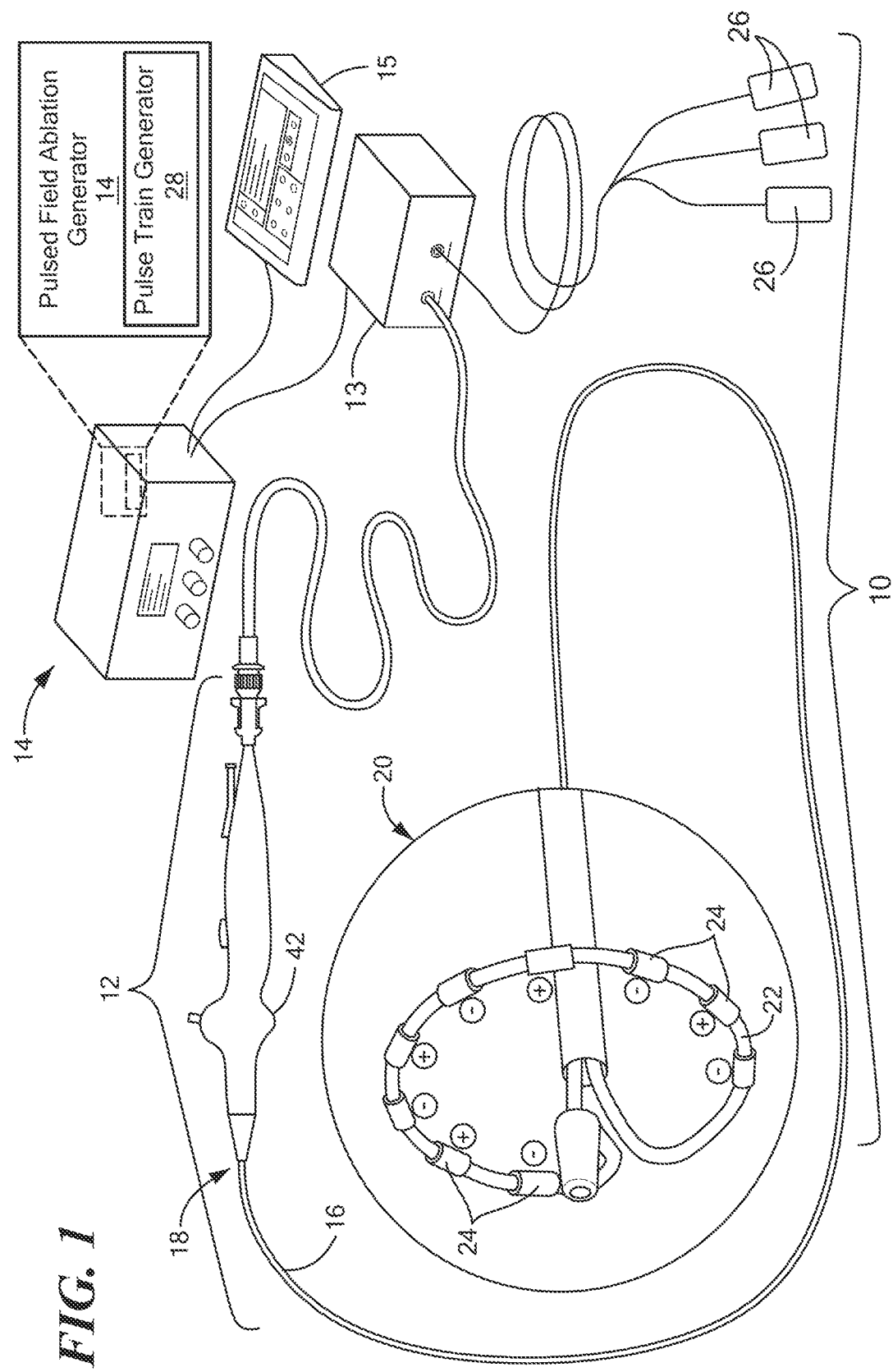
FIG. 1 is a system view of an example medical system configured to delivery pulsed electric field energy via a pulse train generator configured according to principles set forth herein.

Referring now to the drawings in which like reference designators refer to like elements there is shown in FIG. 1 an example electrosurgical system 10 configured to deliver electrical energy to irreversibly electroporate tissue and designated generally as "10." In some particular embodiments, the system 10 is designed to ablate cardiac tissue to treat cardiac arrhythmias, such as atrial fibrillation. The system 10 generally includes a medical device 12 that may be coupled directly to an energy supply, for example, a pulsed field ablation generator 14 including an energy control, delivering and monitoring system or indirectly through a catheter electrode distribution system 13. A remote controller 15 may further be included in communication with the generator 14 for operating and controlling the various functions of the pulsed field ablation generator 14. The medical device 12 may generally include one or more diagnostic or treatment regions for energetic, therapeutic and/or investigatory interaction between the medical device 12 and a treatment site. The treatment region(s) may deliver, for example, pulsed electric field energy to a tissue area in proximity to the treatment region(s).

Pulse field ablation (PFA) utilizes high-voltage pulses to induce cell death through a process called electroporation. Without being limited by theory, the induced electric field from PFA is believed to be the primary mechanism for causing cell death, e.g., as opposed to temperature-centric mechanisms of radio frequency (RF) ablation or cryogenic ablation. Accordingly, the electrical pulses delivered in PFA can have relatively large voltages (e.g., pulse amplitudes) on the order of 500V to 4000V with pulse widths of 0.1 microseconds to 100 microseconds.

The medical device 12 may include an elongate body 16 (e.g., catheter 16) passable through a patient's vasculature and/or positionable proximate to a tissue region for diagnosis or treatment, such as a catheter, sheath, or intravascular introducer. The catheter 16 may define a proximal portion 18 and a distal portion/end 20 and may further include one or more lumens disposed within the catheter 16 thereby providing mechanical, electrical, and/or fluid communication between the proximal portion 18 of the catheter 16 and the distal portion 20 of the catheter 16. The distal portion 20 may generally define the one or more treatment region(s) of the medical device 12 that are operable to monitor, diagnose, and/or treat a portion of a patient. The treatment region(s) may have a variety of configurations to facilitate such operation. In the case of purely bipolar pulsed field delivery, distal portion 20 includes electrodes that form the bipolar configuration for energy delivery where energy passes between one or more electrodes and one or more different electrodes on the same electrode array. In an alternate configuration, a plurality of the electrodes 24 may serve as one pole while a second device containing one or more electrodes (not pictured) would be placed to serve as the opposing pole of the bipolar configuration.

For example, as shown in FIG. 1, the distal portion 20 may include an electrode carrier arm 22 that can transition between a linear configuration and an expanded configuration in which the carrier arm 22 has an arcuate or substantially circular configuration. The carrier arm 22 may include the plurality of electrodes 24 (for example, nine electrodes 24, as shown in FIG. 1) that are configured to deliver pulsed-field energy. Further, the carrier arm 22 when in the expanded configuration may lie in a plane that is substantially orthogonal to the longitudinal axis of the catheter 16. The planar orientation of the expanded carrier arm 22 may facilitate ease of placement of the plurality of electrodes 24 in contact with the target tissue. Alternatively, the medical device 12 may have a linear configuration with the plurality of electrodes 24. For example, the distal portion 20 may include six electrodes 24 linearly disposed along a common longitudinal axis.

The system 10 may further include three or more surface ECG electrodes 26 on the patient in communication with the pulsed field ablation generator 14 through the catheter electrode distribution system 13 to monitor the patient's cardiac activity for use in determining pulse train delivery timing at the desired portion of the cardiac cycle, for example, during the ventricular refractory period. In addition to monitoring, recording or otherwise conveying measurements or conditions within the medical device 12 or the ambient environment at the distal portion of the medical device 12, additional measurements may be made through connections to the multi-electrode catheter 16 including for example temperature, electrode-tissue interface impedance, delivered charge, current, power, voltage, energy or the like in the pulsed field ablation generator 14 and/or the medical device 12.

The surface ECG electrodes 26 may be in communication with the pulsed field ablation generator 14 for initiating or triggering one or more alerts or therapeutic deliveries during operation of the medical device 12. Additional neutral electrode patient ground patches (not pictured) may be employed to evaluate the desired bipolar electrical path impedance, as well as monitor and alert the operator upon detection of inappropriate and/or unsafe conditions. which include, for example, improper (either excessive or inadequate) delivery of charge, current, power, voltage and energy delivered to the plurality of electrodes 24; improper and/or excessive temperatures of the plurality of electrodes 24, improper electrode-tissue interface impedances; improper and/or inadvertent electrical connection to the patient prior to delivery of high voltage energy by delivering one or more low voltage test pulses to evaluate the integrity of the tissue electrical path.

The pulsed field ablation generator 14 may include processing circuitry 30 including a processor in communication with one or more controllers and/or memories containing software modules containing instructions or algorithms to provide for the automated operation and performance of the features, sequences, calculations, or procedures described herein. In particular, the pulsed field ablation generator 14 includes a pulse train generator 28. The pulse train generator 28 is configured to generate and transmit pulse trains with pulses of different pulse widths (and possibly also different pulse amplitudes) according to a sequence for transmitting the generated pulses as explained in greater detail below.

Thus, the pulsed field ablation generator 14 includes an electrical current or pulse train generator 28 which may have a plurality of output channels, with each channel coupled to an individual electrode of the plurality of electrodes 24 or multiple electrodes of the plurality of electrodes 24 of the medical device 12. The pulsed field ablation generator 14 may be operable in one or more modes of operation, including for example: (i) bipolar energy delivery between at least two electrodes 24 or electrically-conductive portions of the medical device 12 within a patient's body, (ii) monopolar or unipolar energy delivery to one or more of the electrodes or electrically-conductive portions on the medical device 12 within a patient's body and through either a second device within the body (not shown) or a patient return or ground electrode (not shown) spaced apart from the plurality of electrodes 24 of the medical device 12, such as on a patient's skin or on an auxiliary device positioned within the patient away from the medical device 12, for example, and (iii) a combination of the monopolar and bipolar modes.

FIG. 2 is a block diagram of an example implementation of the pulsed field ablation generator 14 and the pulse train generator 28. The pulse field ablation generator 14 includes processing circuitry 30 which may include a memory 32 and a processor 34 (e.g., an electronic processor 34) in communication with the memory 32. The pulse train generator 28 may be embodied by the electronic processor 34 and may be configured to generate and provide to electrodes 24 at least two sets/sequences of pulses, each sequence having different pulse parameters such that the two sets of pulses are configured to preferentially target cells of different, respective orientations as explained in greater detail below (e.g., see FIG. 13).

According to certain embodiments, the processing circuitry 30 may include the processor 34 and the memory 32. In some instances, in addition to or instead of a processor, such as a central processing unit, and memory, the processing circuitry 30 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the processing circuitry 30 further has software stored internally in, for example, memory 32, or stored in external memory (e.g., database, storage array, network storage device, etc.) accessible by the processor 34. The software may be executable by the processing circuitry 30. The processing circuitry 30 may be configured to control any of the methods and/or processes described herein and/or to cause such methods, and/or processes to be performed, e.g., by the pulsed field ablation generator 14. Processor 34 corresponds to one or more processors 34 for performing functions of the pulsed field ablation generator 14 described herein. The memory 32 is configured to store data, programmatic software code and/or other information described herein. In some embodiments, the software may include instructions that, when executed by the processor 34 and/or processing circuitry 30, causes the processor 34 and/or processing circuitry 30 to perform the processes described herein with respect to the pulsed field ablation generator 14, including the process steps of generating first and second pulse trains of different pulse widths to achieve preferential ablation of differently/oppositely oriented cells, for example, as explained in greater detail below.

More specifically, the pulse train generator 28 may implement the steps of generating a pulse train including a first set of pulses, each pulse of the first set of pulses having a first set of pulse parameters (e.g., a first pulse width) that preferentially ablate first cells having a first orientation, and including a second set of pulses, each pulse of the second set of pulses having a second set of pulse parameters (e.g., a second pulse width different than the first pulse width) that preferentially ablate second cells having a second orientation that is different than the first orientation. According to various embodiments, the first and second set of pulse parameters can include different pulse widths. More particular embodiments are directed towards sets of pulses with different pulse widths with the same, or substantially the same, set of other pulse parameters. In certain embodiments, the pulse train generator 28 can be configured to provide either the first or second set of pulses as the first set of pulses within a pulse train, followed by the second set of pulses and/or may be configured to provide the first set of pulses and second set of pulses interspersed with each other within a pulse train as explained in greater detail below with respect to FIGS. 4-12B.

The pulsed field ablation generator 14 also includes a communication interface 40 configured to transmit pulse trains to the catheter 16 according to a sequence of transmission of sets of pulses within a pulse train to achieve ablation of the first cells and the second cells. Thus, the first cells and the second cells can be ablated when the catheter distal end 20 is in a first position (e.g., location and orientation) without having to move the catheter distal end 20 to a second position to ablate the second cells after ablating the first cells.

Embodiments of the present disclosure recognize that in cardiac ablation with irreversible electroporation, targeted cells (e.g., cardiomyocytes, and/or other types of cells) may be of elongated shape and their orientation may vary. For example, cardiomyocytes tend to be longer in one direction and shorter in the second orientation. Ventricular myocytes are typically 100 to 150 millimeters in length and 20 to 35 millimeters in width. In some instances, an elongated cell may be defined as a cell that has a long axis (e.g., corresponding to length of the cell) at least twice as long as a short axis (e.g., corresponding to width of the cell) that is perpendicular to its long axis. In some instances, an elongated cell may have a long axis that is less than at least twice as long as its short axis but that is still longer than its short axis. In some instances, cellular orientation refers to a direction of the length (e.g., long axis) of cells having an elongate shape with respect to an electric field applied to the cells. For example, some elongated cells within a targeted tissue may have a first orientation including their respective long axis oriented more perpendicular to the electric field than parallel to the electric field (e.g., long axis oriented approximately perpendicular to the electric field) while some elongated cells within the targeted tissue may have a second orientation including their respective long axis oriented more parallel to the electric field than perpendicular to the electric field (e.g., long axis oriented approximately parallel to the electric field).

Figure 13:
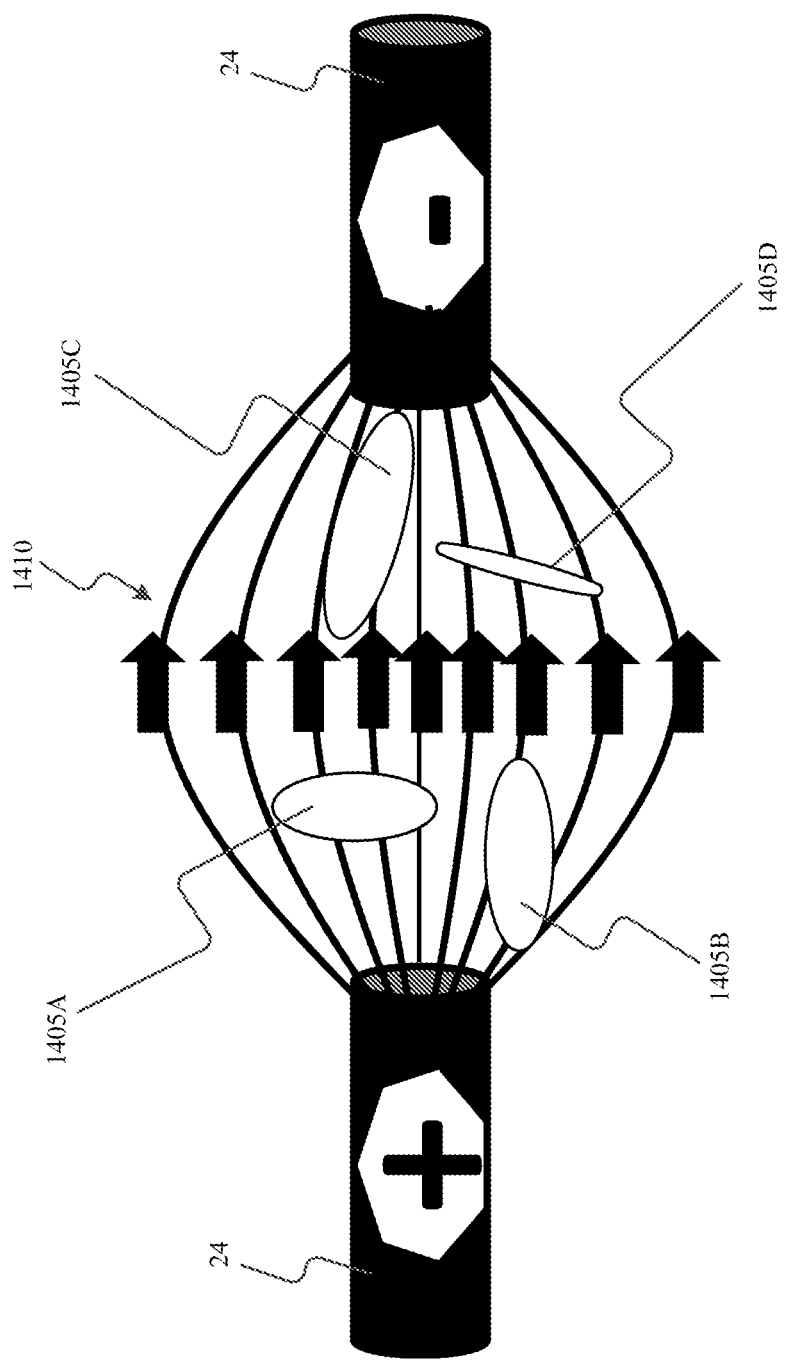
FIG. 13 illustrates an example electric field between two electrodes of the medical system of FIG. 1 according to some example embodiments.

FIG. 13 illustrates an example electric field 1410 between two electrodes 24. The electric field 1410 may pass through a plurality of elongated cells 1405 that may have different shapes, sizes, and/or orientations than each other as indicated in FIG. 13. For example, the elongated cells 1405A and 1405D are oriented perpendicularly with respect to the electric field 1410 (or at least oriented more perpendicularly than parallel with respect to the electric field 1410). On the other hand, the elongated cells 1405B and 1405C are oriented parallel with respect to the electric field 1410 (or at least oriented more parallel than perpendicularly with respect to the electric field 1410). It should be understood that the elements shown in FIG. 13 have been enlarged for viewing purposes and are not shown to scale.

Embodiments of the present disclosure recognize that cardiomyocytes have highly orientated cellular substrates. The cellular orientation can change depending on location within the heart. Additionally, embodiments of the present disclosure recognize that cell orientation affects an extent of electroporation/cell death with respect to electric fields generated by sets of pulses that includes different pulse widths. For example, testing shows that a first electric field in a first direction through tissue and generated by a first set of pulses that has a first pulse width that is below a pulse width crossover threshold (e.g., approximately 3 microseconds to 6 microseconds) has a higher electroporation effect on cells 1405A, 1405D that are oriented perpendicularly with respect to the electric field 1410 than on cells 1405B, 1405C that are located parallel with respect to the electric field 1410. On the other hand, testing also shows that a second electric field in the first direction through the same tissue and generated by a second set of pulses that has a second pulse width that is above the pulse width crossover threshold has a higher electroporation effect on cells 1405B, 1405C that are oriented parallel with respect to the electric field 1410 than on cells 1405A, 1405D that are located perpendicularly with respect to the electric field 1410. For example, according to testing, up to 100 times more pores may be formed in cells 1405 oriented perpendicularly with the electric field 1410 generated by short pulse width pulses than cells 1405 oriented in parallel with the electric field 1410 generated by short pulse width pulses. Similarly, up to 1000 times more pores may be formed in cells 1405 oriented in parallel with the electric field 1410 generated by long pulse width pulses than cells 1405 oriented perpendicularly with the electric field 1410. In some instances, within the range of the pulse width crossover threshold (e.g., approximately 3 microseconds to 6 microseconds), cells 1405 of both orientations are electroporated to approximately the same extent.

In some instances, low pulse widths that are less than the pulse width crossover threshold may include a pulse width within a range of 0.5 microseconds to 5 microseconds, within a range of 0.1 microseconds to 1 microsecond, within a range of 0.2 microseconds to 2 microseconds, within a range of 1 microsecond to 2 microseconds, or the like. In some instances, high pulse widths that are greater than the pulse width crossover threshold may include a pulse width within a range of 10 microseconds to 100 microseconds, within a range of 5 microseconds to 50 microseconds, within a range of 10 microseconds to 50 microseconds, within a range of 10 microseconds to 20 microseconds, or the like. A pulse train including one or more sets of pulses (e.g., a first set of pulses) with a low pulse width and one or more sets of pulses (e.g., a second set of pulses) with a high pulse width may include any low pulse width within the example low pulse width ranges and any high pulse width the within the example high pulse width ranges. For example, any of the sets of pulses included in the example pulse trains shown in FIGS. 4-12B may include pulse widths within any of the example ranges explained above or in between such ranges (e.g., as the pulse widths are gradually adjusted in some of the example pulse widths such as in FIGS. 5A-5B and 7A-7B.

In some situations with an electric field 1410 that is generated by pulses that have a low pulse width (e.g., less than the pulse width crossover threshold), the electric field 1410 may have an increasing electroporation effect (e.g., preferential ablation) on cells 1405 (e.g., ability to kill the cell 1405) as the cells 1405 are oriented more perpendicularly with respect to the electric field 1410 and a decreasing electroporation effect on cells 1405 as the cells 1405 are oriented more parallel with respect to the electric field 1410. Similarly, in some situations with an electric field 1410 that is generated by pulses that have a high pulse width (e.g., greater than the pulse width crossover threshold), the electric field 1410 may have an increasing electroporation effect (i.e., preferential ablation) on cells 1405 as the cells 1405 are oriented more parallel with respect to the electric field 1410 and a decreasing electroporation effect on cells 1405 as the cells 1405 are oriented more perpendicularly with respect to the electric field 1410.

According to aspects of this disclosure, in some embodiments, the pulsed field ablation generator 14 is configured to generate and deliver at least two sets/sequences of pulses, each sequence having different pulse parameters configured to preferentially target cells 1405 of different, respective orientations. In particular embodiments, the two sequences of pulses can have of different pulse widths, where each sequence preferentially ablates cells 1405 of different orientations with the same positioning and orientation of the catheter 16/plurality of electrode(s) 24.

Applying pulses having different pulse parameters may, in some instances, provide a more uniform ablation across cells 1405 in different orientations. In some examples, as described in greater detail below, the respective pulse trains used to generate an electric field 1410 to ablate tissue may be monophasic or biphasic, may be of different length, or may include interspersed sets of pulses with different parameters (alternating between pulses of different widths or alternating between a first set of pulses of a first width and a second set of pulses of a second width) as explained in greater detail below with respect to FIGS. 4-12B. In some embodiments, the pulses of different sets of pulses within a pulse train may have different amplitudes to limit the overall energy applied to a target tissue.

FIG. 3 is a flowchart of an example process that may be performed by the pulsed field ablation generator 14, and more particularly by the pulse train generator 28 to generate and provide a pulse train to an electrode 24 (e.g., one or more electrodes 24) to cause the electrode 24 to produce an electric field 1410 to ablate a plurality of cells 1405 of a target tissue. The process includes generating and providing a first set of pulses of the pulse train to an electrode 24 (e.g., one or more electrodes 24) to cause the electrode 24 to produce a first electric field 1410 that has a higher electroporation effect on (e.g., that preferentially ablates) first elongated cells 1405 having a first orientation (e.g., a perpendicular orientation with respect to the electric field 1410) than on second elongated cells 1405 (of the same type, for example, cardiomyocytes) having a second orientation different than the first orientation(Block S10). The process also includes generating and providing a second set of pulses of the pulse train to the electrode 24 to cause the electrode 24 to produce a second electric field 1410 that has a higher electroporation effect on (e.g., that preferentially ablates) the second elongated cells 1405 having the second orientation (e.g., a parallel orientation with respect to the electric field 1410) than on the first elongated cells 1405 (Block S12). In some instances, a second pulse width of the second set of pulses is greater than a first pulse width of the first set of pulses. For example, the first pulse width may be below the pulse width crossover threshold explained above, and the second pulse width may be above the pulse width crossover threshold explained above. In some instances, the catheter 16/electrode 24 is positioned at a same position (e.g., location and orientation relative to the target tissue) during an entirety of time that the pulse train (including both the first set of pulses and the second set of pulses) is provided to the electrode 24 to generate electric fields 1410. Accordingly, the first electric field based on the first set of pulses and the second electric field based on the second set of pulses are both emitted from the same position of the catheter 16/electrode 24 and in a same direction toward the target tissue.

By executing the process of FIG. 3, the pulse train generator 28 may allow PFA to operate more effectively (e.g., resulting in more uniform homogenous ablation compared to other techniques or resulting in approximately uniform homogenous ablation) regardless of an orientation of a catheter 16/electrodes 24 providing the electric field 1410 to the target tissue. For example, because part of the pulse train preferentially ablates (e.g., has a greater electroporation effect) on cells 1405 of a first orientation while another part of the pulse train preferentially ablates other cells 1405 of a different orientation, each part of the pulse train may be adjusted to more uniformly ablate the cells 1405 in a target issue without repositioning the catheter 16/electrodes 24.

Referring now to FIGS. 4-12B, example pulse trains combinations of at least two sets of pulses with at least one different pulse parameter (e.g., different pulse widths, different pulse amplitudes, etc.). In some examples, pulse train generator 28 may be configured to generate the example pulse trains shown in FIGS. 4-12B and transmit the pulse trains to catheter 16/electrodes 24, which may then generate an electric field 1410 to deliver the energy to tissue at an ablation site. While the illustrated pulse trains are described with respect to generator 28 and catheter 16 for purposes of illustration, it should be understood that other generators and catheters/electrodes capable of generating and delivering pulsed electric fields to tissue may be used to generate and deliver the pulse trains shown in FIGS. 4-12B.

As explained previously herein, the effect of otherwise similar electric pulses on tissue depends on the pulse width of pulses in the signal applied to the catheter 16. At longer pulse widths, cells 1405B, 1405C in tissue which are parallel to the electric field orientation may be preferentially/more affected by ablating these cells 1405B, 1405C to a greater extent and more efficiently than cells 1405A, 1405D that are perpendicular to the electric field orientation. Cells 1405A, 1405D oriented perpendicular to the electric field 1410 may be more affected by very short pulses. The techniques described in this disclosure provide varied pulse width waveforms to affect both parallel and perpendicular cells/tissue fibers. Such a variable waveform, e.g., having pulses of different pulse widths, may offer the advantage of being effective at achieving more uniform ablation of differently-oriented cells 1405 without having to change the orientation of the distal end 20 of the catheter 16. Hence, in some instances, the techniques of this disclosure may be used to ablate a given area of tissue (e.g., highly oriented areas such as cardiomyocytes) more quickly and effectively (e.g., using less overall energy) during a procedure, e.g., without repositioning the distal end 20 of catheter 16 to ablate cells 1405 in the given area that have different orientations In some examples, pulse train generator 28 may be pre-programmed with a plurality of modes, each mode associated with a pulse train having particular amplitude and/or pulse width characteristics, such as those describe with respect to FIGS. 4-12B. In such examples, an operator may select a particular mode from the available modes. In some instances, modes may be associated with a particular ablation location and/or desired lesion characteristic.

Figure 4:
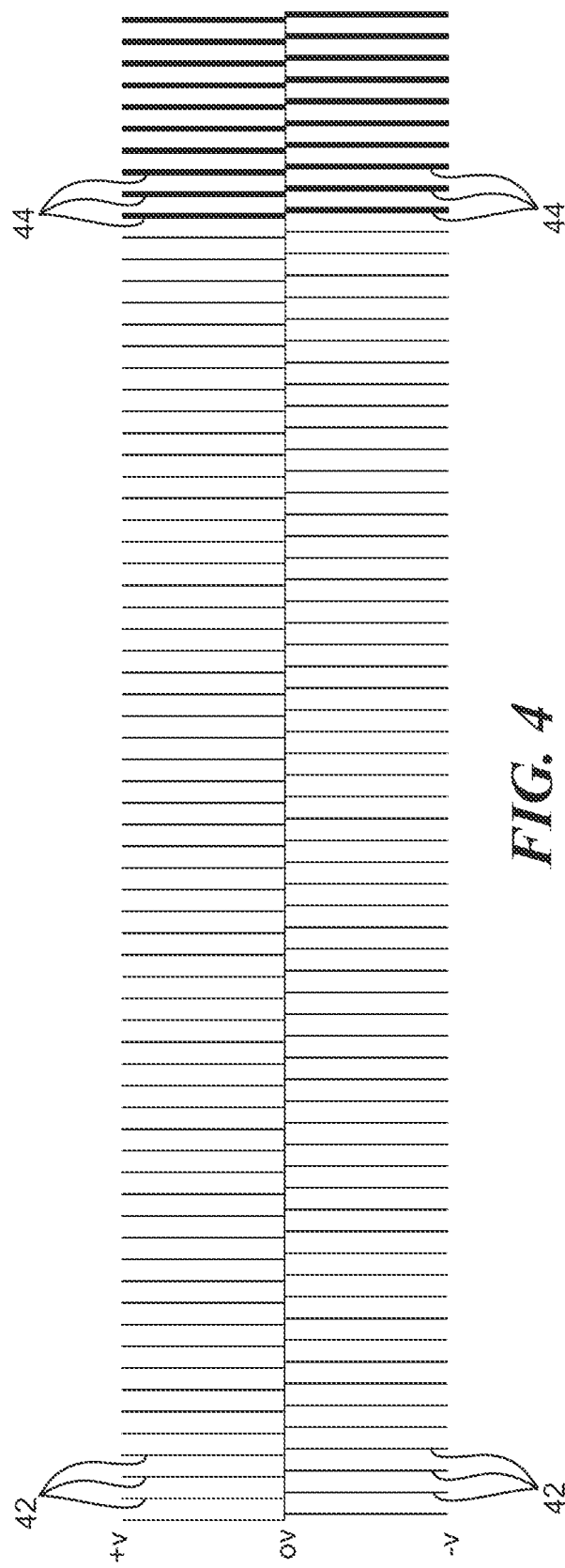
FIG. 4 is a graph of an example biphasic pulse train delivered by the system shown in FIG. 1.

With the exception of FIG. 4 that illustrates a pulse train including biphasic pulses, the pulse trains depicted in the following embodiments of FIGS. 4-12B are shown as being composed of monophasic pulses for simplicity. It should be understood that the variable pulse width trains described below may also be composed of biphasic pulses (e.g., as shown in FIG. 4), but for simplification, they are shown as monophasic pulse trains except for the embodiment shown in FIG. 4. Moreover, the pulse trains described herein may have an example "on time" of about 360 microseconds per phase of a biphasic waveform or 720 microseconds for the full biphasic pulse train. Other "on times" are contemplated by this disclosure. Additionally, the amplitudes of each pulse, as described herein may increase or decrease with the pulse width. For example, for larger pulse widths, the pulse amplitude may be lower than the pulse amplitude of pulses of narrower widths. This may be useful to regulate the power delivered to the tissue by a pulse. For example, a pulse width a longer pulse width may have a lower amplitude to reduce an amount of energy delivered to a target tissue compared to if a higher amplitude was used with the longer pulse width. Such reduction in energy may keep the energy delivered to the target tissue low enough to be delivered in a non-thermal manner to the target tissue.

In FIG. 4, a train of pulses (i.e., a pulse train) includes a first plurality/set of pulses 42, which may have a first pulse width that is below the pulse width crossover threshold described previously herein (e.g., a pulse width of between 1-5 microseconds). In the configuration shown in FIG. 4, the first plurality of pulses 42 may be biphasic and may include more than 75% of the total number of pulses in the pulse train. Additionally, a second plurality/set of pulses 44 having a second pulse width that is above the pulse width crossover threshold described previously herein (e.g., a pulse width of between 10-50 microseconds) is also included as part of the train of pulses shown in FIG. 4. As shown, in some instances, the first set of pulses 42 is provided to the electrode 24 before the second set of pulses 44 is provided to the electrode 24, and the first set of pulses 42 is provided to the electrode 24 for a longer period of time than the second set of pulses 44 such that the first set of pulses 42 makes up a larger portion of the pulse train than the second set of pulses 44. In some instances, the second of pulses 44 make up a lesser portion of the pulse train to limit overall energy output of the pulse train because each second pulse 44 generates more energy output than each first pulse 42 since the second pulse width is longer than the first pulse width. From another aspect, the pulse train of FIG. 4 may be viewed as a concatenation in time of a first pulse train having a plurality of first pulses and a second pulse train having a plurality of second pulses. In some embodiments, the duration of pulses and pulse trains may be selected so that the total "on time" (a time of non-zero amplitude, for example) of both short and longer pulses is similar to the total "on time" of a pulse train of pulses of intermediate width. Adding too many long pulses may be avoided to avoid delivering a cumulative energy which may result in undesired hyperthermal effects.

In FIG. 4, the second plurality of pulses 44 may have a second pulse width of between 10-20 microseconds and are at the tail end of the pulse train. Thus, the longer pulses 44 at the end of the pulse train occur after the shorter pulses 42 at the beginning of the pulse train, in the example of FIG. 4. This means that the shorter pulses 42 during the beginning of the pulse train will preferentially ablate cells 1405A, 1405D oriented perpendicular to the applied electric field 1410. Then, during the application of the longer pulses 44 at the end of the pulse train, cells 1405B, 1405C oriented parallel to the applied electric field 1410 will be preferentially ablated. This reduces/obviates any need to reorient the distal end 20 of the catheter 16 to achieve homogenous ablation. Beginning with shorter pulses 42 having higher frequency content followed by longer pulses 44 may produce less undesired muscle stimulation or pain, thereby possibly placing nerves and muscles in a form of tetany, which may prevent transmission of contractions or pain responses.

Referring now to FIG. 5A, in another configuration, the pulse train generator 28 may be configured to deliver a pulse train having a first plurality/set of pulses 42 at a beginning of the pulse train and deliver a second plurality/set of pulses 44 at an end of the pulse train. As shown in FIG. 5A, the pulse train may include wherein the a third plurality/set of pulses 52 provided to the electrode 24 after the first set of pulses 42 and before the second set of pulses 44. In some instances, the third set of pulses 52 includes a third pulse width that increases from the first pulse width of the first pulses 42 to the second pulse width of the second pulses 44 over multiple pulses 52 of the third set of pulses 52. As shown in the example of FIG. 5A, in some instances, each successive pulse in the third set of pulses 52 has a respective pulse width that is greater than the third pulse width of its immediately preceding pulse. In other instances, the third pulse width may increase less rapidly (e.g., every other third pulse 52 or the like). Thus, in some embodiments, a wide range of pulse widths may be included in the pulse train and a gradual shift from pulses 42 with pulse widths on one side of the pulse width crossover threshold to pulses 44 with pulses on the other side of the pulse width crossover threshold may occur.

In another configuration, as shown in FIG. 5B, the amplitudes of each successive group of pulses of the third set of pulses 52 that decrease in pulse width has an amplitude that is less than an amplitude of a preceding pulse group in the third set of pulses 52. For example, the first set of pulses 42 include a first amplitude, and the third set of pulses 52 include a second amplitude that decreases from the first amplitude to a lower amplitude over multiple pulses 52 of the third set of pulses 52. In some instances, each pulse 52 of the third set of pulses 52 that increases in pulse width with respect to its immediately preceding pulse 52 decreases in amplitude with respect to its immediately preceding pulse 52. By increasing the pulse width gradually and/or decreasing the amplitude gradually (e.g., evenly over a period of time in which the pulse width is increased from the first pulse width to the second pulse width, in stages as shown in FIG. 5B, etc.), the techniques described herein may be used to control the rate of preferential ablation with respect to different cell orientations and the rate of change of power/energy applied to the cells 1405 of each of a plurality of cell orientations without moving the distal end 20 of the catheter 16. Note that in FIG. 5B, each pulse of a successive group of second pulses 44 has a pulse width that is greater than a pulse width of a pulse in a preceding group of second pulses 44. Delivery of a wider range of pulse widths may enable effective preferential ablating of a wider variety of cell orientations and cell shapes. Also, ending with pulses of longer duration may improve ablation efficacy by increasing electrochemical effects of longer pulses, while lowering the tissue threshold for electroporation.

Figure 6A:
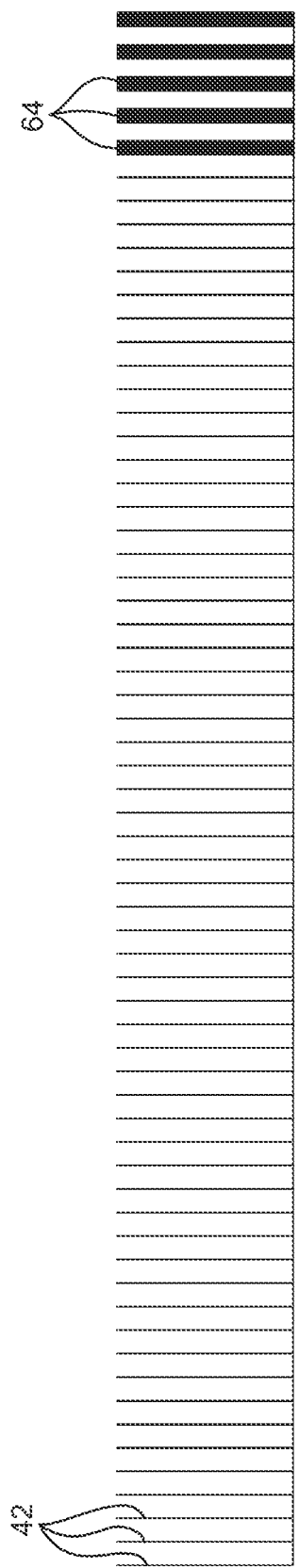
FIG. 6A is a graph of another example pulse train delivered by the system shown in FIG. 1.
Figure 6B:
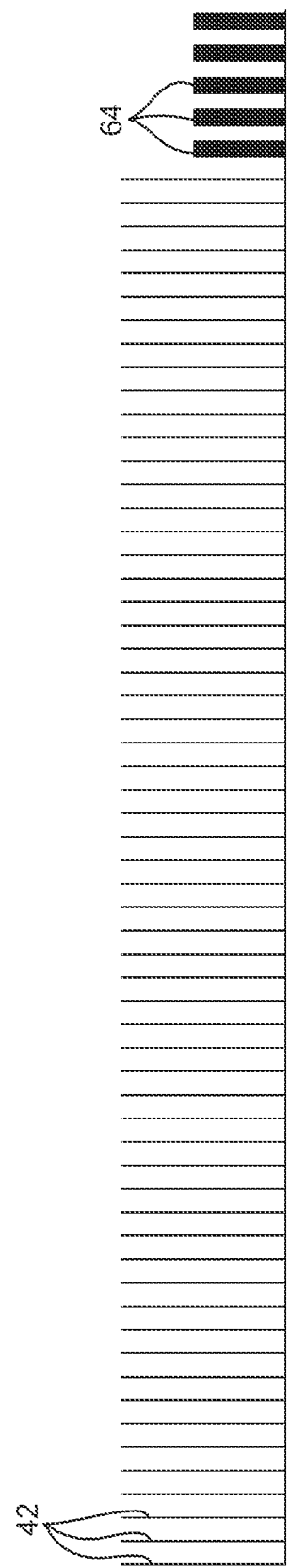
FIG. 6B is a graph of another example pulse train delivered by the system shown in FIG. 1.

Referring now to FIG. 6A, in another configuration, the pulsed field ablation generator 14 may be configured to deliver the first set of first pulses 42 and then deliver a second set of second pulses 64 which have a pulse width of at least 50 microseconds. In another configuration shown in FIG. 6B, the second pulses 64 have a second amplitude that is smaller/less than a first amplitude of the first pulses 42. As noted above, the duration of a pulse determines which cell orientation is affected, and the amplitude of the pulse affects an energy/power of the electric field 1410 applied to the cells 1405. Thus, for example, the power delivered during long pulse widths may be lowered (e.g., by using a lower amplitude pulse) since the applied power will be present for a longer period of time. Additionally or alternatively, less of the longer second pulses 64 may be included in the pulse train than the shorter first pulses 42 as sown in FIGS. 6A and 6B. In this way, any one or more of a plurality of ablation therapies may be delivered with considerably improved control over known methods.

Figure 7A:
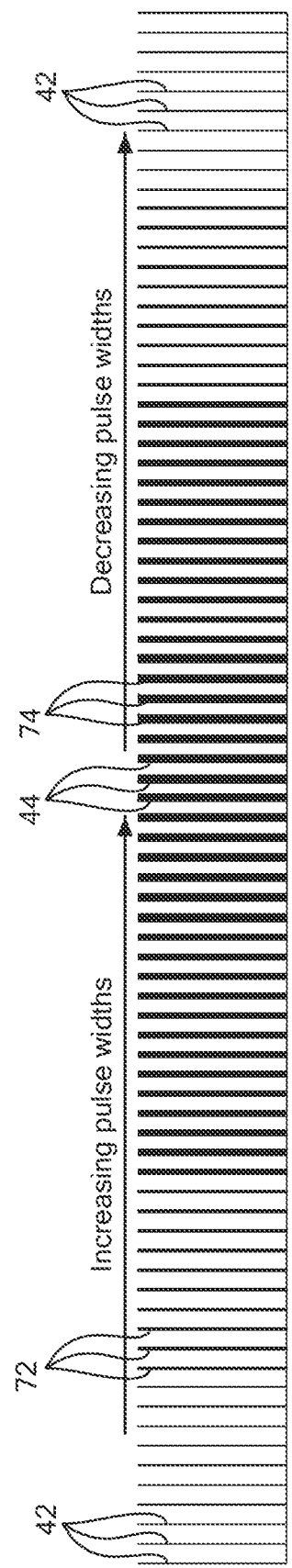
FIG. 7A is a graph of another example pulse train delivered by the system shown in FIG. 1.

Referring now to FIG. 7A, the pulsed train generator 14 may be configured to deliver a first set of first pulses 42 followed by delivery of a second set of second pulses 44 that have second pulse widths that are longer than first pulse widths of the first pulses 42. As shown in FIG. 7A, in some instances, the pulse train includes a first instance of the first set of pulses 42 that is provided to the electrode 24 before the second set of pulses 44 is provided to the electrode 24 and a second instance of the first set of pulses 42 that is provided to the electrode 24 after the second set of pulses 44 is provided to the electrode 24. The pulse train also may include a third set of pulses 72 provided to the electrode 24 after the first instance of the first set of pulses 44 and before the second set of pulses 44. The third set of pulses 72 may include a third pulse width that increases from the first pulse width to the second pulse width over multiple pulses 72 of the third set of pulses 72. The pulse train may also include a fourth set of pulses 74 provided to the electrode 24 after the second set of pulses 44 and before the second instance of the first set of pulses 42. The fourth set of pulses 74 includes a fourth pulse width that decreases from the second pulse width to the first pulse width over multiple pulses 74 of the fourth set of pulses 74. The respective increasing and decreasing of pulse widths of the third set of pulses 72 and the fourth set of pulses 42 may increase or decrease in similar manner as described previously herein with respect to FIGS. 5A and 5B. In some embodiments, this sequence of pulses or groups of pulses may result in a more homogenous ablation compared to pulse trains that use pulses of a single pulse width. In some instances, providing different sequences of pulses of different widths provides greater control over the preferential ablation of cells 1405 of different orientations.

Figure 7B:
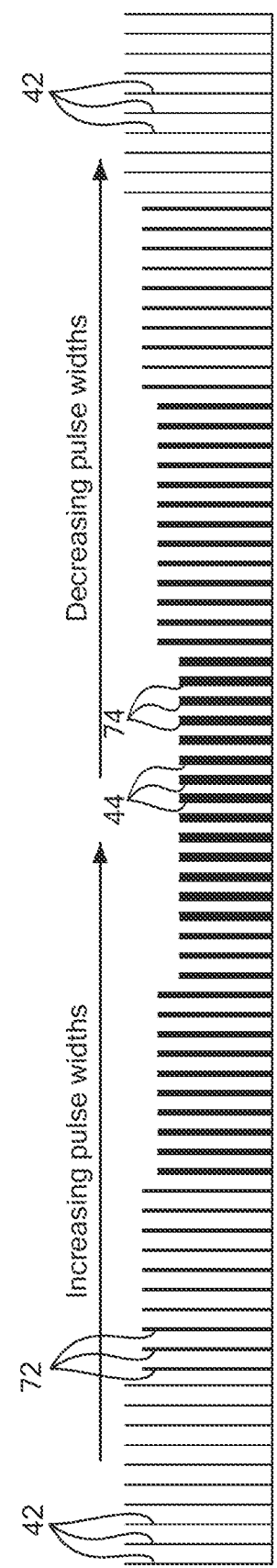
FIG. 7B is a graph of another example pulse train delivered by the system shown in FIG. 1.

The pulse train of FIG. 7B is similar to that of FIG. 7A except that the amplitudes of some pulses 44, 72, 74 are adjusted inversely with respect to pulse width adjustment. As shown in FIG. 7B, the first set of pulses 42 has a first amplitude, and the second set of pulses 44 has a second amplitude lower than the first amplitude. Additionally, the third set of pulses 72 has a third amplitude that decreases from the first amplitude to the second amplitude over multiple pulses 72 of the third set of pulses 72. The fourth set of pulses 74 has a fourth amplitude that increases from the second amplitude to the first amplitude over multiple pulses 74 of the fourth set of pulses 74. In some instances, each successive pulse in the third set of pulses 72 and the fourth set of pulses 74 has a respective pulse width that is adjusted with respect to the pulse width of its immediately preceding pulse. In other instances, the pulse widths may be adjusted less rapidly (e.g., every other pulse 72, 74 or the like). In some instances, each pulse of the third set of pulses 72 that increases in pulse width with respect to its immediately preceding pulse 72 decreases in amplitude with respect to its immediately preceding pulse 72. In some instances, each pulse 74 of the fourth set of pulses 74 that decreases in pulse width with respect to its immediately preceding pulse 74 increases in amplitude with respect to its immediately preceding pulse 74.

As an example of the pulse trains shown in FIGS. 7A and 7B, the third set of pulses 72 begins with a plurality of short, 1-2 microseconds duration pulses with pulse widths increasing to the middle of the pulse train to approximately 10-40 microseconds pulse durations, and then follows with the fourth set of pulses 74 having pulse widths decreasing over the last half of the pulse train back to ending with 1-2 microsecond pulse durations. Providing different sequences of pulses of different widths provides greater control over the preferential ablation of cells 1405 of different orientations. In particular, the short 1-2 us pulse widths may reduce pain and stimulation felt by the patient while still providing adequate preferential ablation of perpendicularly oriented cells 1405. Then, the longer pulses that follow may preferentially ablate cells 1405 oriented in the parallel directions. Also, starting and ending with shorter pulses may reduce perceived pain and stimulation from the pulse trains (short pulses have less stimulative or painful effect). In this way, benefits of longer pulses, including a lower threshold and preferentially killing of parallel cells 1405, can be achieved without increasing pain and unwanted stimulation.

Figure 8A:
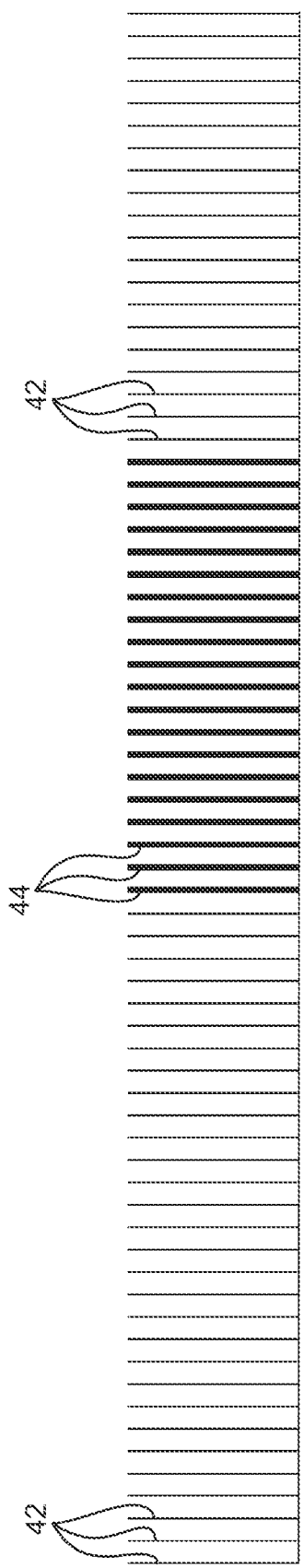
FIG. 8A is a graph of another example pulse train delivered by the system shown in FIG. 1.
Figure 8B:
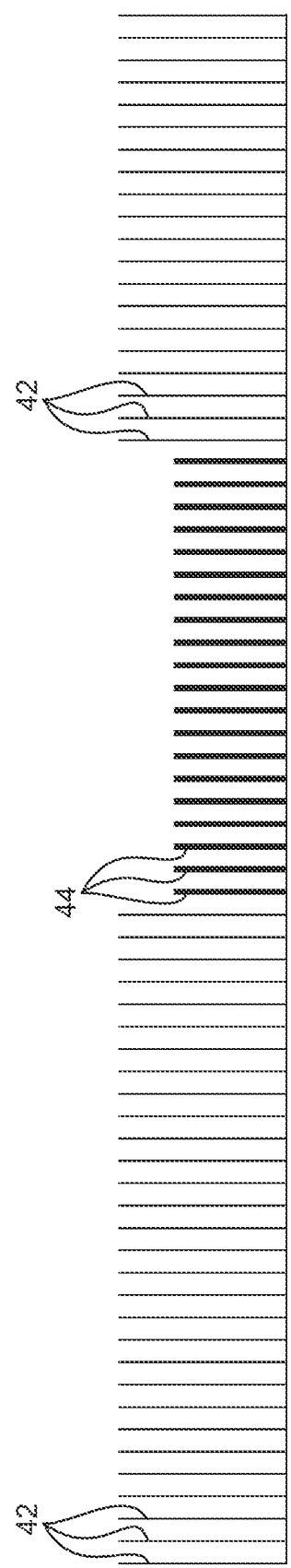
FIG. 8B is a graph of another example pulse train delivered by the system shown in FIG. 1.
Figure 10A:
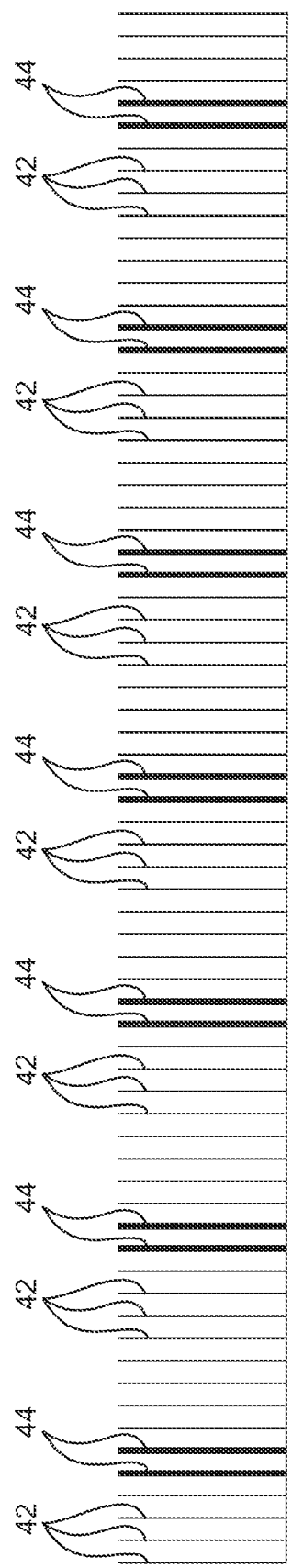
FIG. 10A is a graph of another example pulse train delivered by the system shown in FIG. 1.
Figure 10B:
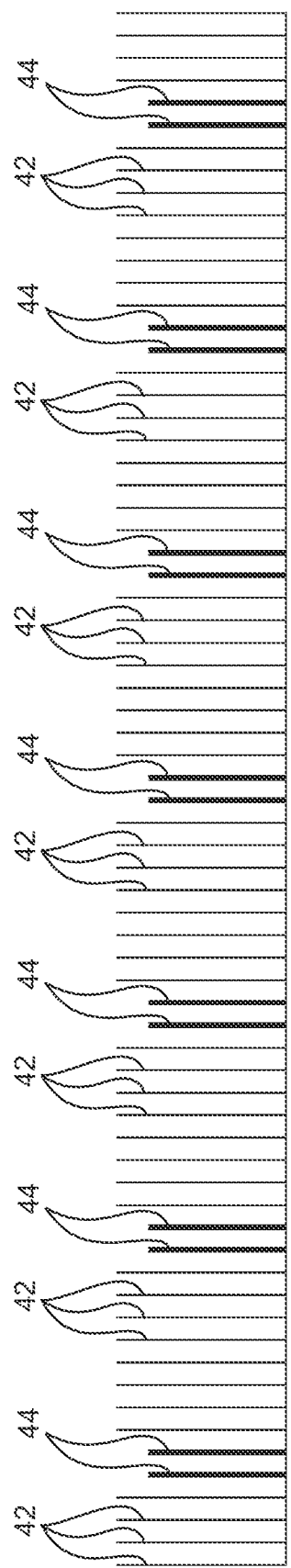
FIG. 10B is a graph of another example pulse train delivered by the system shown in FIG. 1.
Figure 11A:
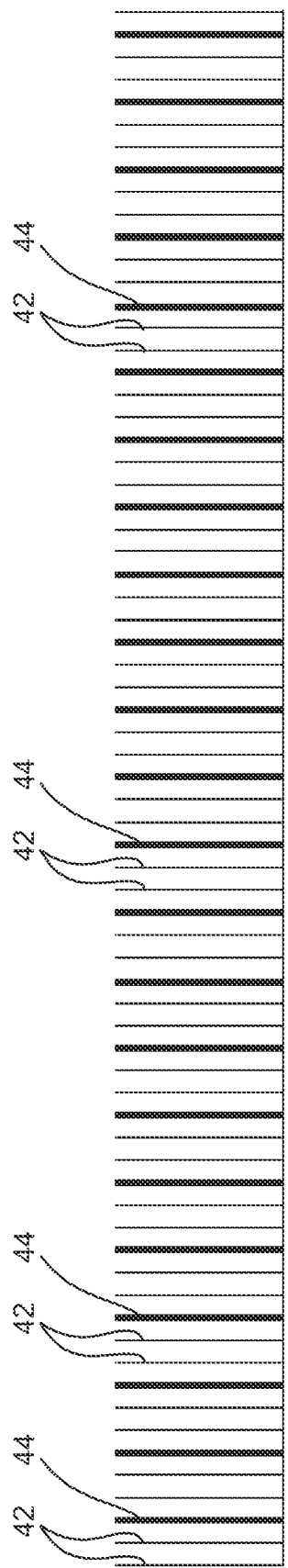
FIG. 11A is a graph of another example pulse train delivered by the system shown in FIG. 1.
Figure 11B:
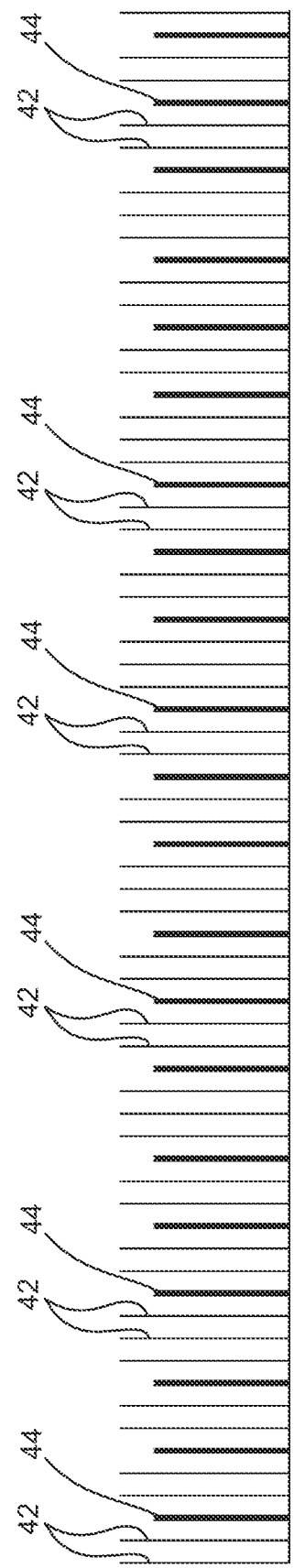
FIG. 11B is a graph of another example pulse train delivered by the system shown in FIG. 1.

In FIG. 8A, the second set of second pulses 44 may be disposed between a first instance and a second instance of the first set of first pulses 42. For example, a first instance of the first set of pulses 42 is provided to the electrode 24 before the second set of pulses 44 is provided to the electrode 24 and a second instance of the first set of pulses 42 is provided to the electrode 24 after the second set of pulses 44 is provided to the electrode 24. FIG. 8B shows a pulse train similar to that of FIG. 8A except that the pulse amplitude of second pulses 44 of the second set of pulses that is disposed between instances of the first sets of pulses 42 have a lower amplitude than the first pulses 42. Providing different sequences of pulses of different amplitudes provides greater control over the preferential ablation of cells 1405 of different orientations. For example, pulses of longer duration may have a lower amplitude than pulses of short duration, which have a high amplitude. The amplitudes may be selected to avoid undesired thermal effects.

Referring to FIG. 9A, the pulse train generator 28 may be configured to deliver first and second pulse trains that provide groups of respective first and second sets of pulses 42, 44, that are interlaced/interspersed with each other (alternating). For example, instances of the first set of pulses 42 and the second set of pulses 44 are sequentially and repeatedly provided to the electrode 24. This can be viewed as an overlay of two trainset of pulses, the first set of pulses 42 having no pulses 42 during periods of time when the second set of pulses 44 has non-zero amplitude pulses 44 of a second pulse width wider than the first pulse width, and the second set of pulses 44 having no pulses 44 during periods of time when the first set of pulses 42 has non-zero amplitude pulses 42 of the first pulse width narrower than the second pulse width. In some instances, a first amount of time that the first set of pulses 42 is provided to the electrode 24 is approximately the same as a second amount of time that the second set of pulses 44 is provided to the electrode 24 as indicated in FIG. 9A. In some instances, the first amount of time and the second amount of time may be different than each other within a pulse train, for example, to provide the shorter pulses 42 for a longer period of time as indicated in previous example pulse trains. Moreover, in some instances, as shown in FIG. 9B, the pulse amplitudes of the second pulses 44 may be smaller than the pulse amplitudes of the first pulses 42. Providing different sequences of pulses of different widths provides greater control over the preferential ablation of cells 1405 of different orientations, as explained above.

Referring now to FIGS. 10A-12B, the pulse train generator 28 may be configured to deliver the first set of pulses 42 and the second set of pulses in different sequences or patterns. In the configuration shown in FIGS. 10A and 10B, first and second sets of pulses 42, 44 may be generated and overlayed/interspersed such that first groups of first pulses of the first set of pulses 42 occur in first time intervals and second groups of second pulses of the second set of pulses 44 occur in second time intervals that do not overlap the first time intervals. For example, pairs of pulses 44 of the second set of pulses 44 are interspersed between a plurality of pulses 42 of the first set of pulses 42. Alternatively, the configurations of FIGS. 10A and 10B may be generated as alternating first and second trainset of pulses 42, 44. FIGS. 11A and 11B show pulse trains that are similar to those of FIGS. 10A and 10B except that instead of pairs of pulses 44, the pulse trains include single pulses 44 of the second set of pulses 44 that are interspersed between a plurality of pulses 42 of the first set of pulses 42. Providing different sequences of pulses of different widths provides greater control over the preferential ablation of cells 1405 of different orientations, as explained above.

Alternatively, FIG. 12A shows a first pulse train with pulses of short, 1-2 microsecond duration and a second pulse train with pulses of longer, 20 microsecond duration. The pulse train with long pulse widths may contain fewer pulses than the trains with short pulses. This may prevent or reduce delivery of an excess of energy when delivering the longer pulse widths. FIG. 12B shows first and second pulse trains having different amplitude and different pulse repetition rates, providing greater control over the extent of preferential ablation of cells 1405 having different orientations. The two pulse trains shown in each of FIGS. 12A and 12B may be applied to the electrode 24 at different times to preferentially ablate a tissue in an approximately homogenous manner.

Certain embodiments are directed toward pulse trains that include different sets of pulses (e.g., with different pulse widths and/or amplitudes) that have a ratio of pulse widths of between 1:2 and 1:50 as indicated by the example pulse width ranges with respect to shorter pulses and longer pulses described previously herein.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method of delivering pulsed electric field energy to perform ablation of a tissue, the method comprising:
   providing a pulse train to an electrode to cause the electrode to produce an electric field to ablate a plurality of cells of the tissue, wherein the plurality of cells include first elongated cells having a first orientation and second elongated cells having a second orientation different than the first orientation;
   wherein the pulse train includes a first set of pulses with a first pulse width and a second set of pulses with a second pulse width greater than the first pulse width,
   wherein the electric field includes a first electric field generated by the electrode based on the first set of pulses and a second electric field generated by the electrode based on the second set of pulses,
   wherein the electrode is positioned at a same position during generation of the first electric field and the second electric field such that the first electric field and the second electric field are emitted from the same position and in a same direction toward the tissue,
   wherein the first electric field is configured to have a higher electroporation effect on the first cells than on the second cells, and
   wherein the second electric field is configured to have a higher electroporation effect on the second cells than on the first cells.

2. The method of claim 1, wherein the first set of pulses is provided to the electrode before the second set of pulses is provided to the electrode, and wherein the first set of pulses is provided to the electrode for a longer period of time than the second set of pulses such that the first set of pulses makes up a larger portion of the pulse train than the second set of pulses.

3. The method of claim 1, wherein the first set of pulses have a first amplitude, and wherein the second set of pulses have a second amplitude that is less than the first amplitude.

4. The method of claim 1, wherein the first set of pulses is provided to the electrode before the second set of pulses is provided to the electrode;
   wherein the pulse train includes a third set of pulses provided to the electrode after the first set of pulses and before the second set of pulses; and
   wherein the third set of pulses includes a third pulse width that increases from the first pulse width to the second pulse width over multiple pulses of the third set of pulses.

5. The method of claim 4, wherein each successive pulse in the third set of pulses has a respective pulse width that is greater than the third pulse width of its immediately preceding pulse.

6. The method of claim 4, wherein the first set of pulses have a first amplitude, and wherein the third set of pulses have a second amplitude that decreases from the first amplitude to a lower amplitude over multiple pulses of the third set of pulses.

7. The method of claim 6, wherein each pulse of the third set of pulses that increases in pulse width with respect to its immediately preceding pulse decreases in amplitude with respect to its immediately preceding pulse.

8. The method of claim 1, wherein a first instance of the first set of pulses is provided to the electrode before the second set of pulses is provided to the electrode and a second instance of the first set of pulses is provided to the electrode after the second set of pulses is provided to the electrode; wherein the pulse train includes a third set of pulses provided to the electrode after the first instance of the first set of pulses and before the second set of pulses; wherein the third set of pulses includes a third pulse width that increases from the first pulse width to the second pulse width over multiple pulses of the third set of pulses; wherein the pulse train includes a fourth set of pulses provided to the electrode after the second set of pulses and before the second instance of the first set of pulses; and wherein the fourth set of pulses includes a fourth pulse width that decreases from the second pulse width to the first pulse width over multiple pulses of the fourth set of pulses.

9. The method of claim 8, wherein the first set of pulses have a first amplitude, and wherein the second set of pulses have a second amplitude lower than the first amplitude;
   wherein the third set of pulses have a third amplitude that decreases from the first amplitude to the second amplitude over multiple pulses of the third set of pulses; and
   wherein the fourth set of pulses have a fourth amplitude that increases from the second amplitude to the first amplitude over multiple pulses of the fourth set of pulses.

10. The method of claim 9, wherein each pulse of the third set of pulses that increases in pulse width with respect to its immediately preceding pulse decreases in amplitude with respect to its immediately preceding pulse; and
   wherein each pulse of the fourth set of pulses that decreases in pulse width with respect to its immediately preceding pulse increases in amplitude with respect to its immediately preceding pulse.

11. The method of claim 1, wherein a first instance of the first set of pulses is provided to the electrode before the second set of pulses is provided to the electrode and a second instance of the first set of pulses is provided to the electrode after the second set of pulses is provided to the electrode.

12. The method of claim 1, wherein the first set of pulses and the second set of pulses are sequentially and repeatedly provided to the electrode.

13. The method of claim 12, wherein a first amount of time that the first set of pulses is provided to the electrode is approximately the same as a second amount of time that the second set of pulses is provided to the electrode.

14. The method of claim 12, wherein pairs of pulses of the second set of pulses are interspersed between a plurality of pulses of the first set of pulses.

15. The method of claim 1, wherein single pulses of the second set of pulses are interspersed between a plurality of pulses of the first set of pulses.

16. The method of claim 1, wherein the first electric field is configured to have the higher electroporation effect on the first cells than on the second cells due at least in part to the first pulse width being below a pulse width crossover threshold, and
wherein the second electric field is configured to have the higher electroporation effect on the second cells than on the first cells due at least in part to the second pulse width being above the pulse width crossover threshold.

17. The method of claim 1, wherein each elongated cell of the first elongated cells and the second elongated cells has a long axis at least twice as long as a short axis that is perpendicular to the long axis.

18. The method of claim 17, wherein the first orientation includes the first elongated cells having their respective long axis oriented more perpendicular to the electric field than parallel to the electric field; and
wherein the second orientation includes the second elongated cells having their respective long axis oriented more parallel to the electric field than perpendicular to the electric field.

19. The method of claim 1, wherein the first pulse width falls within a range of 0.5 microseconds to 5 microseconds, and wherein the second pulse width falls within a range of 10 microseconds to 100 microseconds.

20. A generator configured to deliver pulsed electric field energy to perform ablation of a tissue, the generator comprising:
processing circuitry configured to provide a pulse train to an electrode to cause the electrode to produce an electric field to ablate a plurality of cells of the tissue, wherein the plurality of cells include first elongated cells having a first orientation and second elongated cells having a second orientation different than the first orientation;
wherein the pulse train includes a first set of pulses with a first pulse width and a second set of pulses with a second pulse width greater than the first pulse width,
wherein the electric field includes a first electric field generated by the electrode based on the first set of pulses and a second electric field generated by the electrode based on the second set of pulses,
wherein the electrode is positioned at a same position during generation of the first electric field and the second electric field such that the first electric field and the second electric field are emitted from the same position and in a same direction toward the tissue,
wherein the first electric field is configured to have a higher electroporation effect on the first cells than on the second cells, and
wherein the second electric field is configured to have a higher electroporation effect on the second cells than on the first cells.

21. The generator of claim 20, wherein the first set of pulses have a first amplitude, and wherein the second set of pulses have a second amplitude that is less than the first amplitude.

22. The generator of claim 20, wherein the first electric field is configured to have the higher electroporation effect on the first cells than on the second cells due at least in part to the first pulse width being below a pulse width crossover threshold, and
wherein the second electric field is configured to have the higher electroporation effect on the second cells than on the first cells due at least in part to the second pulse width being above the pulse width crossover threshold.

* * * * *